United States Patent [19]
Mirapuri et al.

[11] Patent Number: 5,590,294
[45] Date of Patent: Dec. 31, 1996

[54] METHOD AND APPARATUS FOR RETARTING PIPELINE PROCESSING

[75] Inventors: Sunil Mirapuri, Mountain View; Thomas J. Riordan, Los Altos, both of Calif.

[73] Assignee: Silicon Graphics, Inc., Mountain View, Calif.

[21] Appl. No.: 449,588

[22] Filed: May 24, 1995

Related U.S. Application Data

[63] Continuation of Ser. No. 229,076, Apr. 18, 1994, abandoned, which is a continuation of Ser. No. 671,560, Mar. 19, 1991, abandoned.

[51] Int. Cl.⁶ .................................................. G06F 9/38
[52] U.S. Cl. .............................. 395/591; 395/800
[58] Field of Search ................................... 395/375, 800

[56] References Cited

U.S. PATENT DOCUMENTS

| | | | |
|---|---|---|---|
| 4,701,915 | 10/1987 | Kitamura et al. | 395/182.04 |
| 4,750,112 | 6/1988 | Jones et al. | 395/375 |
| 4,760,519 | 7/1988 | Papworth et al. | 395/375 |
| 5,019,967 | 5/1991 | Wheeler et al. | 395/775 |
| 5,027,270 | 6/1991 | Riordan et al. | 395/467 |
| 5,060,148 | 10/1991 | Isobe et al. | 395/800 |
| 5,119,483 | 6/1992 | Madden et al. | 395/375 |
| 5,193,158 | 3/1993 | Kinney et al. | 395/375 |
| 5,203,003 | 4/1993 | Donner | 395/800 |
| 5,317,701 | 5/1994 | Reininger et al. | 395/375 |
| 5,325,495 | 6/1994 | McLellan | 395/375 |
| 5,404,552 | 4/1995 | Ikenaga | 395/800 |

OTHER PUBLICATIONS

Hennessy, et. al. "The MIPS Machine" *Proceeding of the IEEE* Feb., 1982, pp. 2–7.

Ramamoorthy, et. al. "Pipeline Architecture" *ACM Computing Surveys* vol. 9, No. 1, Mar., 1977 pp. 61–101.

Hennessy "VLSI Processor Architecture" *IEEE Transactions on Computers* vol. C–33, No. 12, Dec., 1984 pp. 1221–1246.

"Pipelining in SISD Machine Designs" pp. 212–225.

Namjoo, et. al. "CMOS Gate Array Implementation of the SPARC Architecture" *IEEE* 1988 pp. 10–13.

Grohsoki "Machine Organization of the IBM RISC System/6000 Processor" *IBM J. Res. Develop.* vol. 34, No. 1, Jan., 1990.

Namjoo et al. CMOS Gate Array Implementation of the SPARC Architecture IEEE 1988.

*Primary Examiner*—William M. Treat
*Assistant Examiner*—Kenneth R. Coulter

[57] ABSTRACT

A method and apparatus for restarting an instruction processing pipeline after servicing one or more interlock processing faults. A pipeline architecture is defined in which processing interdependencies (such as instruction latencies, resource conflicts, cache accesses, virtual address translations and sign extend operations) are presumed not to be present so as to increase pipeline throughput. Interdependencies which actually occur appear as processing faults which then are serviced. At the completion of the servicing, pipeline restarting operations occur, during which the portions of the pipeline which are invalidated are preloaded. Preloading includes backing-up the invalidated stages and re-executing such stages with corrected information so as to fill the pipeline. The pipeline portions (e.g., stages) which are invalidated are determined by the type of processing fault which occurs. Upon completion of preloading, normal instruction pipeline processing resumes.

8 Claims, 10 Drawing Sheets

METHOD AND APPARATUS FOR RETARTING PIPELINE PROCESSING

This is a Continuation of application Ser. No. 08/229,076 filed Apr. 18, 1994, now abandoned which is a continuation of application Ser. No. 07/671,560 filed Mar. 19, 1991, now abandoned.

BACKGROUND OF THE INVENTION

This invention relates to the pipeline processing of instructions in a processing unit, and more particularly to a method and apparatus for recovering from fault conditions and restarting the pipeline.

As microprocessing technology has advanced, methods of improving throughput have been sought. In addition to increasing the brute force of processors by increasing the clock speed, techniques to optimize the processor handling of activities have been pursued. One result has been the development of pipeline processing. Pipeline processing is one way to reduce the effective number of cycles required to execute an instruction by overlapping the execution of multiple instructions. Because the processing of a single instruction involves more than one or many actions, each instruction can be broken up into several discrete portions. Each portion then can be handled by a different stage of a processor.

A single instruction is pipelined through the stages until the processing of the instruction is complete. At any given clock cycle, one portion of the instruction is performed by a specific stage of the processor. As the other stages are not being used for the instruction during that same clock cycle, other instructions may use the other stages. Accordingly, as an instruction advances from stage to stage, additional instructions enter the pipeline and get pipelined through. Thus, multiple instructions are processed during a single clock cycle.

An instruction pipeline can potentially reduce the amount of time required per instruction by a factor equal to the depth of the pipeline. Fulfilling this potential requires that the pipeline always be filled with useful instructions and that nothing delay the advance of instructions in the pipeline. Such requirements impose certain demands on the processing architecture. For example, when serially executing an instruction stream in which each instruction may require a different number of clock cycles, there may be competition for the processor resources. Referring to FIG. 1A, a serial execution of six variable-length instructions is compared to a theoretized pipeline execution of the same instructions. The six instructions include a simple four-cycle instruction A, followed by two complex eight-cycle instructions B,C, followed by a more complex twelve-cycle instruction D, followed by a simple four-cycle instruction E, and a complex eight-cycle instruction F. As shown, 44 cycles are needed to process the six instructions serially for an average of 7.33 cycles per instruction.

Referring to FIG. 1B (Pipeline execution), the instruction portions with the letter E indicate cycles where multiple instructions require the use of the same resource. Competition for these resources blocks the progression of the instruction through the pipeline and causes delay cycles to be introduced for many of the instructions (as indicated by the blank blocks) until the resource becomes available. As depicted, 29 cycles are needed for the pipeline execution for an average of 4.83 cycles per instruction. Thus, the pipeline technique shortens the average number of cycles/instruction, although the gains are greatly reduced by the delay cycles added. In practice, moreover, the negative effects of variable execution times are much worse than shown in the example.

An objective of RISC systems has been to define an instruction set in which execution of all, or most, instructions require a uniform number of cycles. Even such RISC architectures, however, require effective management of events such as branches, exceptions and interrupts that can completely disrupt the flow of instructions.

Referring to FIG. 2, an instruction execution sequence is shown for a RISC-type R2000 processor instruction. The instruction includes five primary portions: instruction fetch (IF); read operands from registers while decoding instruction (RD); perform operation on instruction operands (ALU); access memory (MEM); and write back results to register file (WB). Referring to FIG. 3, the R2000 instruction pipeline is shown as a 5 stage pipeline, one stage per instruction portion recited above. According to the uniform instruction-length design, a competition for resources occurs only if a sign extend is needed (so that additional ALU operation is needed) or if necessary to wait for a multi-cycle co-processor operation.

Inherent in the pipeline structure are latencies for a load or branch instruction. Load instructions have a delay, or latency, of one cycle before the data is available for a subsequent instruction. Jump and branch instructions also have a delay, or latency, of one cycle while the instruction is fetched and the target address is determined. Such latencies are defined herein as processing interdependencies. One way to resolve this interdependency is to stall or delay the pipeline, as is done in conventional pipeline processors. The R2000 continues execution despite the interdependency and relies on software to avoid putting an instruction behind the instructions (i.e., load, jump or branch) which need the information before the information is ready. For example, the assembler can organize the instructions so that a useful instruction follows. If not possible to do so, a NOP instruction is inserted.

Other interferences to the smooth flow of the pipeline are exceptions, (i.e., bus error, reset, interrupt, reserved instruction, system call, overflow). When an exception is detected, the R2000 interrupts the normal execution flow, aborts the instruction causing the exception, and aborts all those instructions in the pipeline which have already started execution. A jump to the designated exception handler routine also occurs. After the exception is processed, the processor returns to the instruction causing the abort or, if that instruction also was aborted to the preceding instruction.

In summary, previous pipeline processors have introduced stall cycles into the pipeline to wait for competing resources, relied on software (e.g., assemblers) to avoid latent delays from load, jump and branch instructions and aborted the pipeline in response to exceptions.

The introduction of stall cycles into the pipeline to stall execution of all instructions in the pipeline except the instruction using the needed resource slows the pipeline more than necessary. Such stalls cause instructions that are not competing for the resource to be stalled. Accordingly, a more effective pipeline method is needed to further enhance the pipeline execution flow.

The reliance upon software to avoid latent delays adds an undesirable burden to such software. Accordingly, a more effective solution to handling latencies by the processor itself is needed.

SUMMARY OF THE INVENTION

According to the invention, pipeline throughput is improved by a processing pipeline architecture in which processing interdependencies (such as the instruction latencies described above, resource conflicts, cache accesses, virtual address translations and sign extend operations) are presumed not to be present. Interdependencies which actually occur appear as processing faults which then are serviced. Faults classified as "interlocks" are serviced in hardware, while stalling the pipeline. Faults classified as "exceptions" are serviced with software and handled conventionally. At completion of interlock servicing, pipeline restart operations occur, during which portions of the pipeline are preloaded.

According to one aspect of the invention, the normal pipeline processing does not include stall states for avoiding potential interdependencies which may or may not be present. Instruction latencies are assumed not to occur. Similarly resource conflicts are assumed not to occur. Accessing cache for fetching an instruction or data is done with the assumption that the instruction or data is present in cache. Virtual address translations are assumed to be available in the translation buffer. Sign extend operations are assumed not to occur. If there is an instruction latency, resource conflict, invalid cache access, translation address miss or sign extend operation, a processing fault (i.e., interlock) occurs.

According to another aspect of the invention, a pipeline restart process and apparatus is provided for preloading portions of the pipeline during an interlock fault recovery so that the pipeline is full when pipeline processing resumes. State machines and control registers are defined for controlling the processor pipeline and the fault recovery procedures. During each clock cycle, the pipeline is checked to evaluate all possible fault causing events. If one or more interlock fault conditions are present, the faults are prioritized for servicing. A processor state machine then switches the processor from a run state to a stall state as determined by the interlock to be serviced. One of several stall state machines corresponding to the particular stall state of the processor state machine then implements the fault recovery procedure for the interlock. Upon completion, the processor state machine redefines the stall state based upon the next interlock fault to be serviced. Accordingly, many faults may be serviced.

When no more faults are to be serviced, a restart state machine is activated to implement pipeline restart procedures. The restart state machine includes a plurality of restart states which are entered sequentially upon sequential clock cycles. During each restart state certain stages in the pipeline are performed to load portions of the pipeline. At the end of the restart, the pipeline is full and ready for normal operation. The restart state machine then returns to an inactive state and the processor state machine returns to the run state.

A further understanding of the invention may be determined from the drawings and the detailed description.

DESCRIPTION OF THE PREFERRED EMBODIMENT

Host Processor Embodiment

Figure 1:
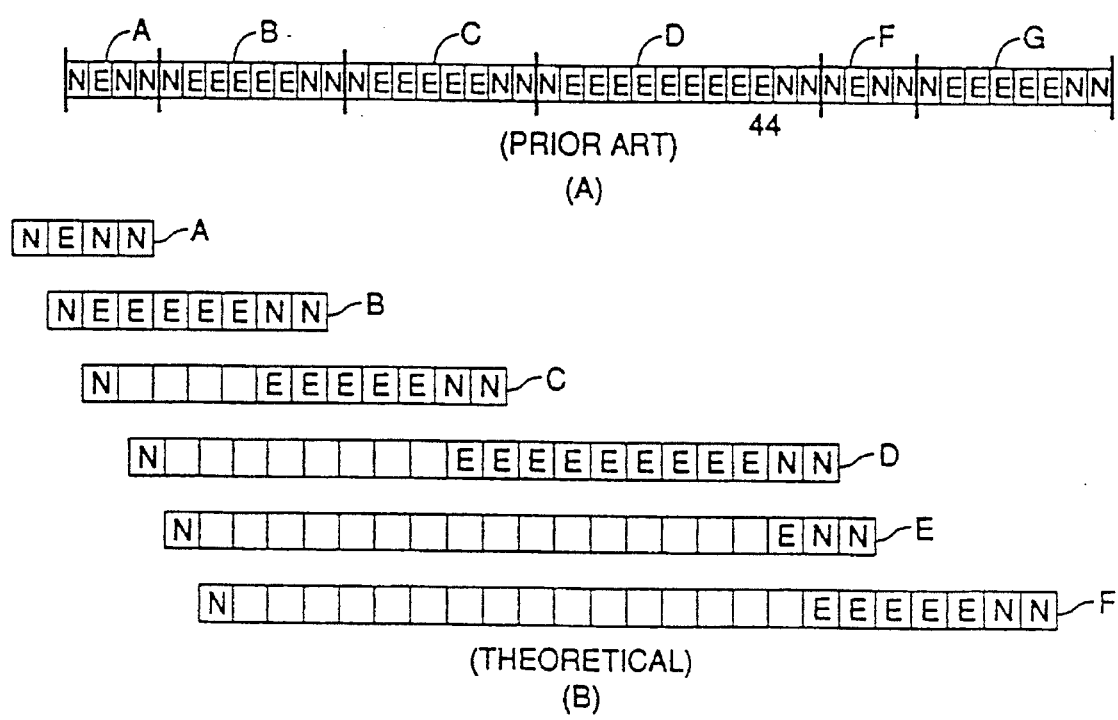
FIG. 1 is a chart comparing a conventional serial instruction processing format with a theoretical pipeline instruction processing format.
Figure 2:
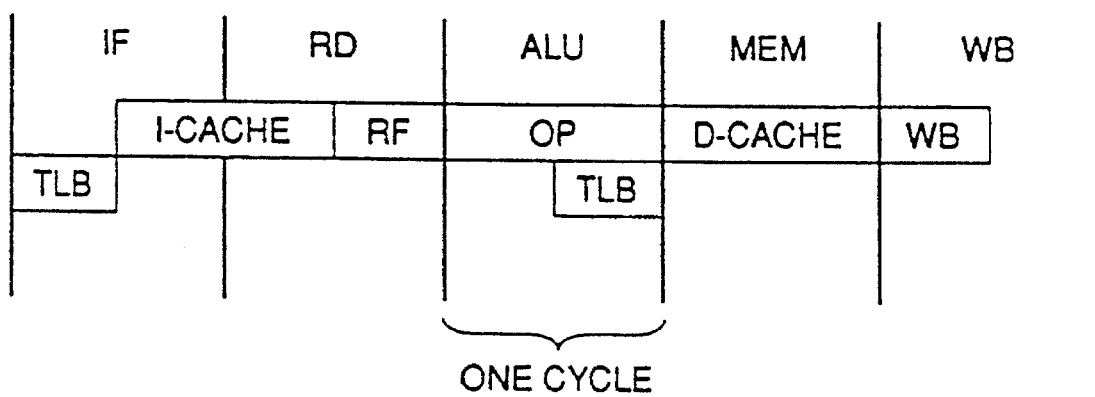
FIG. 2 is a chart depicting the portions of an instruction for a prior art RISC R2000 processor.
Figure 3:
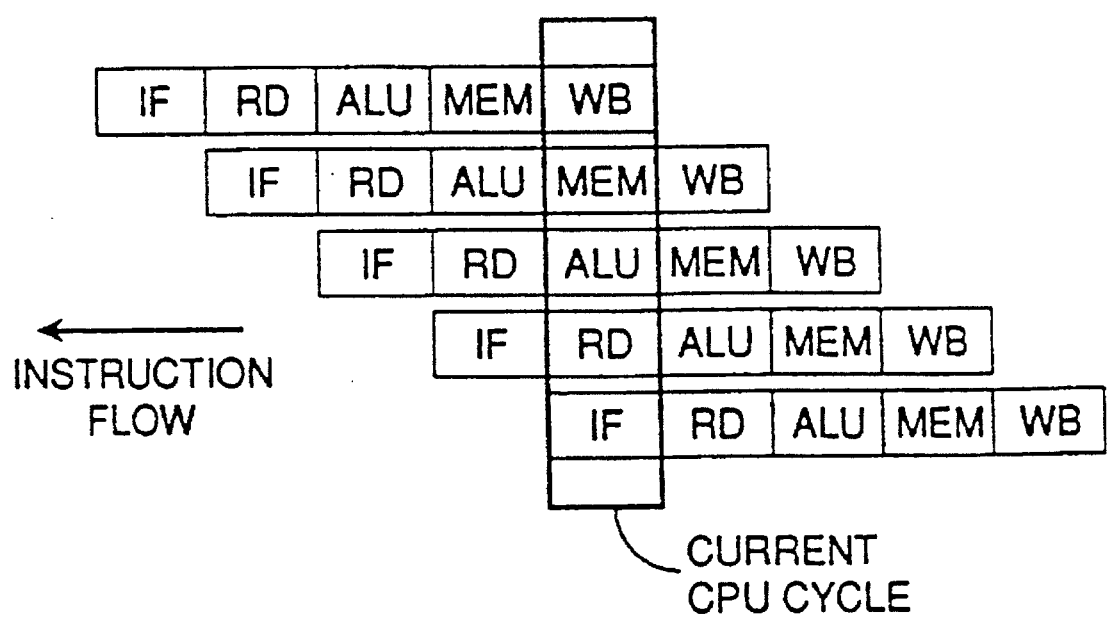
FIG. 3 is a chart depicting the five-stage pipeline of a prior art RISC R2000 processor.
Figure 4:
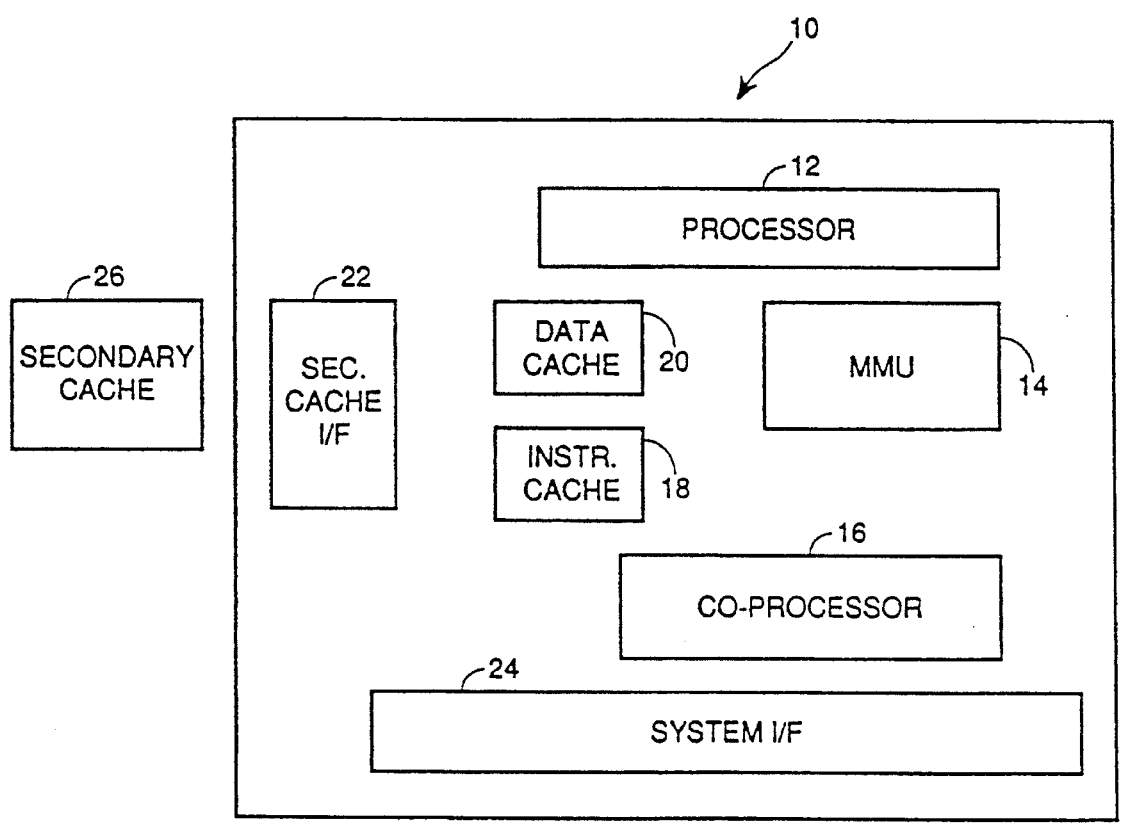
FIG. 4 is a block diagram of a host processor for implementing a pipeline according to the recovery and restart method and apparatus of this invention.

An instruction pipeline restart method and apparatus is described for a host processor. Referring to FIG. 4, a preferred embodiment for a host processor is shown as a reduced instruction set computer (RISC) 10 including a 64-bit integer microprocessor 12, a memory management unit 14, a 64-bit floating point co-processor 16, a primary instruction cache 18, a primary data cache 20, a secondary cache interface 22 and a system interface 24. An external secondary cache 26 may be configured through the secondary cache interface 22. Cache coherent multi-processing is supported through the system interface 24.

The integer processor 12 includes thirty-two general purpose registers, a 64-bit ALU, a 64-bit integer multiplier/divider, and has 64-bit virtual address generation. The memory management unit 14 has a fast translation look-aside buffer, a joint translation look-aside buffer and associated control registers. The fast translation look-aside buffer is used for instructions and referred to as the ITLB. The ITLB is arranged as 2 virtual entries each mapping an even–odd address pair of physical entries. The joint look-aside buffer is used for both instructions and data and is referred to as the JTLB. The JTLB is arranged into virtual entries each mapping an even–odd address pair of physical locations. The ITLB and JTLB are local memory buffers for speeding the translation of the instruction or data from a virtual address to a physical address. In one embodiment the ITLB is a subset of the JTLB.

The floating point co-processor 16 implements the basic operations of single and double precision add, subtract, multiply, divide and conversions, as well as single and double precision square root, explicitly rounded conversions, and load and store double. The computer 10 maintains precise floating point exceptions while allowing both overlapped and pipelined operation.

The primary instruction cache 18 and primary data cache 20 each may range from four to thirty-two K-bytes. The primary caches 18, 20 are direct mapped, 64 bits wide, and have a line size selectable as either 4 or 8 words. The data cache 20 is a write back cache with state bits to support hardware cache coherency.

The secondary cache 26 is direct mapped, implemented in a single memory array, and configurable as split equally between instructions and data, or shared jointly between instructions and data. The secondary cache 26 has a range of 256 K-bytes to 4 Mega-bytes and is write back with state bits to support cache coherency.

The system interface 24 includes a 64-bit multiplexed address/data bus, an 8 bit command bus, a 4-bit processor status bus and handshaking signals. Various cache coherent multiprocessing models are supported through the system interface 24.

Eight-Stage Instruction Pipeline

Figure 5:
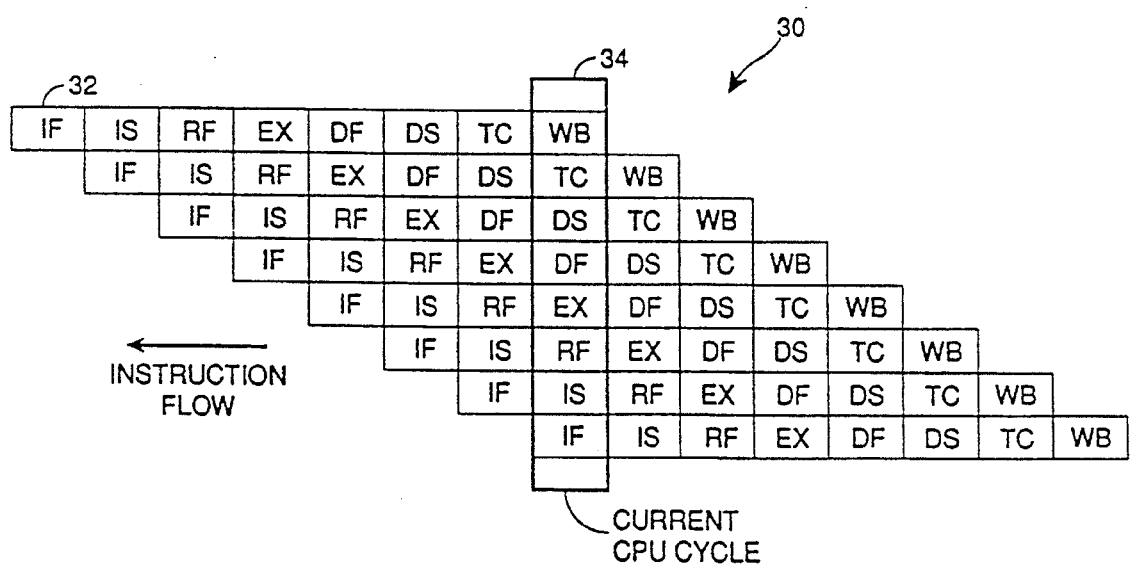
FIG. 5 is a chart depicting an eight-stage pipeline for the host processor of FIG. 4.

The host processor 12 has an eight stage execution pipeline according to the preferred embodiment. Thus, each instruction takes eight clock cycles to execute, while a new instruction is started on each clock cycle. One way of viewing the pipeline is that at any point in time, eight separate instructions are being executed at once. Referring to FIG. 5, the eight stage pipeline 30 is depicted in which a horizontal slice 32 shows the execution process of an individual instruction and a vertical slice shows the processing occurring during one clock cycle for the eight different instructions.

Referring to a horizontal slice 32, an instruction is broken down into eight parts, each part processed in sequential clock cycles to pass through the eight stages. The eight parts of an instruction (horizontally depicted) and corresponding eight stages of the pipeline (vertically depicted) are: instruction-fetch first cycle (IF), instruction-fetch second cycle (IS), register file (RF), execute (EX), data-fetch from cache first cycle (DF), data-fetch from cache second cycle (DS), tag-check on data (TC) and write-back to register (WB).

Figure 6:
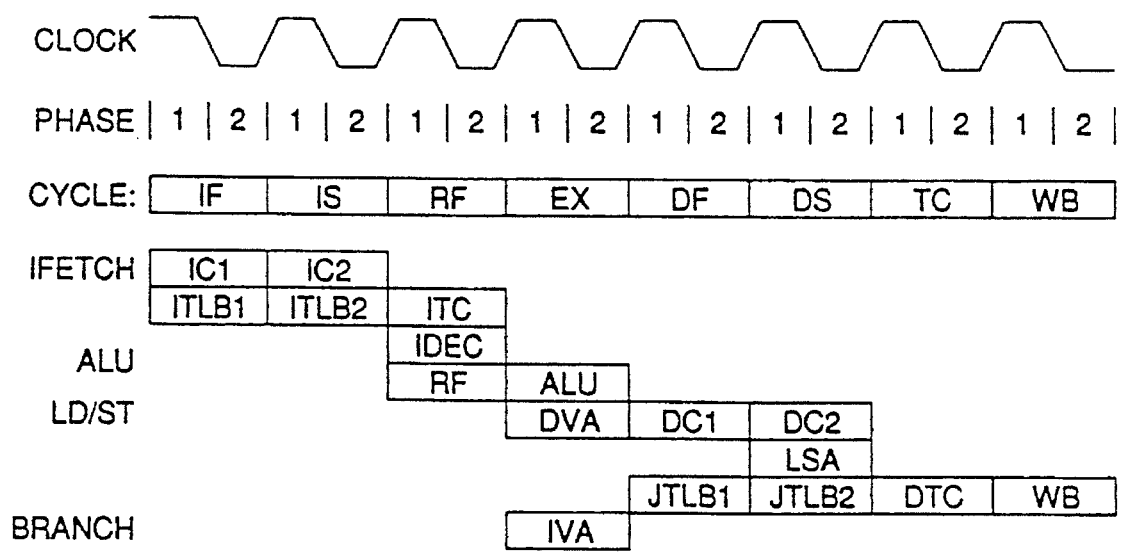
FIG. 6 is a chart depicting the activities that occur within each pipestage as a function of the instruction type for the pipeline of FIG. 5.

Referring to FIG. 6, the processing activities for each instruction portion and within each stage are illustrated as a function of the stage (part). In the IF stage an instruction address is selected by branch logic. In addition, the first half of the instruction cache fetch (IC1) and the corresponding instruction virtual to physical address translation (ITLB1) are performed. The instruction address translation is done through a two-entry subset of the fast or joint translation look-aside buffers (ITLB, JTLB). In the IS stage, the second half of both the instruction cache fetch (IC2) and instruction translation (ITLB2) is done.

During the RF stage, three activities occur in parallel. The instruction decoder (IDEC) decodes the instruction and checks for interlock conditions. Meanwhile, the instruction tag check (ITC) is performed between the instruction cache tag and the page frame number derived from the ITLB's translation. In parallel with both of the above, the instruction operands are fetched from the register file (RF).

In the EX stage, if the instruction is a register-to-register operation, the arithmetic, or logical operation is performed in the ALU. If the instruction is a load or store, a data virtual address is calculated (DVA). If the instruction is a branch, a virtual branch target address is calculated (IVA).

For loads and stores the DF stage is used to do the first half of both the data cache fetch (DC1) and the data virtual to physical address translation (JTLB1). Similarly, the DS stage does the second half of both the data fetch (DC2) and the data translation (JTLB2), as well as the load align or store align (LSA), as appropriate. If the instruction is a branch, the JTLB is used during DF and DS to translate the branch address and refill the ITLB if necessary.

The TC stage is used to perform the tag check for loads and stores (DTC). During the WB stage, the instruction result is written to the register file (WB).

Processing Faults

Smooth pipeline flow is interrupted when cache accesses miss, data dependencies are detected, or when exceptions occur. Interruptions that are handled by hardware, such as cache misses, are referred to as interlocks, while those that are handled using software are referred to as exceptions. Collectively, the cases of all interlock and exception conditions are referred to as faults.

Interlocks are of two types. Interlocks which can be resolved by simply stopping the pipeline are referred to as stalls, while those which require part of the pipeline to advance while holding up another part are referred to as slips.

Figure 7:
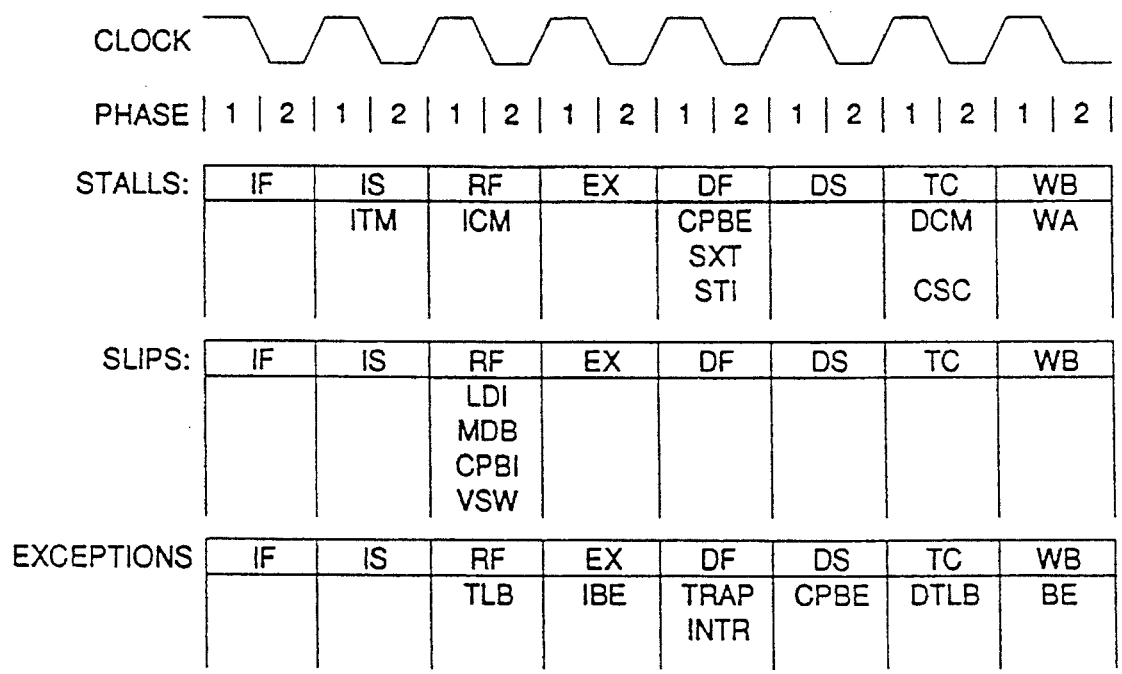
FIG. 7 is a chart showing the types of faults that may be detected at the respective stages of the pipeline of FIG. 5.

At each clock cycle, exception and interlock conditions are checked for all active instructions. Referring to FIG. 7, the exception and interlock conditions are listed for the respective pipeline stages. Each interlock and exception is described below in detail:

ITM—Instruction TLB miss: In processing sequential instructions, the processor 12 accesses an instruction pointer register which points to a virtual address. During the IF and IS stages an instruction is fetched from the primary instruction cache and the pointer's instruction is translated through the fast translation look-aside buffer (ITLB). The ITLB is a local memory for speeding the translation of the instruction from a virtual address to a physical address. If the ITLB is accessed and the translation information is not present, the ITM interlock occurs resulting in a stall condition. As shown in FIG. 7, the ITM stall occurs during the IS stage. During the stall condition, the JTLB is accessed to access the needed information.

ITLB—Instruction translation or addressing exception: During the stall resulting from the above-described ITM interlock, the processor accesses the JTLB for the needed information. If the information is not present in the JTLB, an ITLB exception occurs so that the TLBs are loaded.

ICM—Instruction cache miss: During the IF and IS stages the instruction was fetched from cache without using the translated information. The fetch was based on the virtual address. As an aid in determining whether the fetched instruction is the correct instruction, each instruction is stored in memory with an identifying tag. During the RF stage, the fetched instruction is decoded. A tag check then is performed to compare the tag of the instruction fetched from cache with the page frame number from the TLB translation. If the tag does not match the page frame number, an ICM interlock occurs, resulting in a stall condition. During the stall, the instruction is fetched from a secondary cache or physical memory.

IBE—Instruction bus error: If during an ICM interlock, a bus error occurs while accessing secondary cache or physical memory, an IBE exception occurs during which error recovery procedures are performed.

LdI—Load interlock: A load interlock is detected during the RF stage. Such an interlock results when a first instruction loads a register from memory, and a later instruction attempts to access the same register before the DS stage of the first instruction (e.g., data fetch) occurs. Thus, the contents are not yet available in the register when subsequently accessed. To service the load interlock the next two instructions of the pipeline are slipped so the DS stage may complete before the subsequent access.

MDB—Multiplier/divider unit busy: During the RF stage, the operands are fetched from the register file, and for appropriate instructions, loaded into the multiplier/divider or the floating point coprocessor. If the multiplier/divider is busy handling a prior operation, the MDB slip interlock occurs resulting in a stall. During the slip, the pipeline waits for the multiplier/divider to complete.

CPBI—Coprocessor busy/interlock: Similarly, if the coprocessor is busy handling a prior operation, the CPBI interlock occurs resulting in a slip. During the slip, the pipeline waits for the coprocessor to complete.

VSH—Variable shift: During the execute stage of the pipeline, an arithmetic or logical operation may be performed, or a data virtual address or instruction virtual address may be calculated depending on the instruction. If an overflow occurs when shifting, a VSH interlock occurs resulting in a slip condition.

CPBE—Coprocessor busy/exception: This exception results from an error condition at the coprocessor. A coprocessor stall may occur prior to the exception so as to determine whether the coprocessor accepts an exception condition.

SXT—Sign extend: Sign extend instructions require one clock cycle to perform the operation and another clock cycle to perform the sign extend. For instructions which may require a sign extend, the pipeline assumes that the sign extend is not required. Thus, the operation occurs during the EX stage and a check is done during the next stage, DF, to determine whether a sign extend is needed. If needed, an SXT interlock occurs resulting in a stall condition. During the stall the pipeline waits the one clock cycle while the sign extend operation is performed.

Intr—Interrupt: When an interrupt occurs, the Intr exception is implemented on the following clock cycle (the DF stage following the EX stage). During the exception, the interrupt is handled in software.

Trap—Synchronous trap exceptions: Whenever a software trap occurs (i.e., syscall, breakpoint, reserved instruction, coprocessor unusable, overflow, or other trap), the Trap exception is invoked on the next clock cycle. During the exception, the trap is handled.

DTLB—Data translation or addressing exception: During the DF and DS stages, data is fetched from the primary cache using a portion of the virtual address, while the virtual address is translated using the JTLB. The JTLB is a local memory for speeding the translation of the data from a virtual address to a physical address. If the information is not present in the JTLB, the DTLB exception occurs, during which the JTLB is loaded.

DCM—Data cache miss: After data has been fetched from the primary data cache, the data is decoded during the TC stage. As an aid in determining whether the fetched data is the correct data, each data item is stored in memory with an identifying tag. During the TC stage, the tag of the fetched data is compared with the page frame number from the JTLB translation. If the tag does not match the page frame number, a DCM interlock occurs, resulting in a stall condition. During the stall, the data is fetched from secondary cache or physical memory.

DBE—Data bus error: If during the DCM interlock, a data bus error occurs when accessing the secondary cache or physical memory, an exception occurs, during which error recovery procedures are performed.

StI—Store interlock: Because a store to physical memory requires a relatively long access time, a buffer is used in the primary data cache as an intermediate storage location. The data is buffered until a prescribed bandwidth is available between the host processor and memory. To accomplish a store, a tag check is done before the DF and DS store sub-operations are performed. Thus, the DF and DS stages are not used immediately. If the check matches, then the data is stored in the store buffer until a subsequent non-memory instruction allows enough access time to the cache to store the data.

If a load instruction for the same address subsequent to the store instruction occurs before the data is moved to physical memory, then the data is provided to the load instruction during the same operation in which it is moved out of the buffer. If, however, the load instruction occurs immediately after the store instruction, then the store's tag check is not complete. Thus, the data can not yet be accessed. Accordingly, a store interlock occurs to allow the tag check to complete. The data then is provided to the load instruction and moved to physical memory.

If two stores are buffered when a load instruction occurs for one of the buffered addresses, then a store interlock occurs. During the interlock one of the stores to physical memory is completed, then the data for the other address is provided to the load instruction while being moved to physical memory.

CSC—Cache state change: The cache state for a given line of cache defines whether the cache contents are more current than the corresponding contents in main memory. When data is written to cache, the corresponding data in main memory will differ. Thus, the cache state is altered to reflect the new status. A CSC interlock occurs when data is to be loaded to a cache line, but the cache state for the line indicates that the cache is more current than main memory. As a result the pipeline is stalled while main memory is updated. Because the host processor may be part of a multi-processor system, another processor may write to cache altering the data values of data already accessed in the pipeline. As a result, data fetched may be invalid. When the state of the cache changes, the CSC interlock occurs stalling the pipeline. During the stall, the data is re-fetched to assure that the data in the pipeline is valid.

WA—Watch: For debugging purposes, the host processor may be set using software to watch for an access of a memory location which watches that of a software loaded register. When activated, a watch interlock occurs during the write back stage to stall the processor for enabling time to identify whether a watch exception occurs. A watch exception occurs when trying to access a memory location which matches a software loaded register.

Inherent in the eight-stage pipeline as described is the possible occurrence of an exception resulting from a branch instruction, or a load interlock resulting from a load instruction. Referring to the pipeline of FIG. 5, it is observed that a branch comparison logic operation (IVA) executed during the EX stage will produce an instruction address that will be available for the first stage IF of an instruction loaded into the pipeline 4 clock cycles after the branch instruction. The pipeline, in effect, assumes that the address will not be needed before then, because subsequent instructions continue to be loaded into the pipeline.

For a load instruction, the data is retrieved during the DF and DS stages. The resulting operand, therefore, is not available for the EX stage of a subsequent instruction until after the DS stage of the load instruction is complete. The pipeline, in effect, assumes that the operand will not be needed before then.

If the data operand is needed before the end of the two clock cycles (e.g., one of the first two instructions following the load instruction), a load interlock occurs during which the pipeline is slipped. Accordingly, the load instruction continues, while the instruction requiring the operand and the remainder of the pipeline following such instruction is frozen. In the case where the instruction immediately following the load instruction requires the operand, only the load instruction continues while the rest of the pipeline is frozen. In the case where the second instruction following the load instruction is the first to need the operand, the load instruction and the instruction following the load instruction continue, while the rest of the pipeline is frozen. Thus, at most a two clock cycle slip occurs.

Pipeline Restart Method and Apparatus

Figure 8:
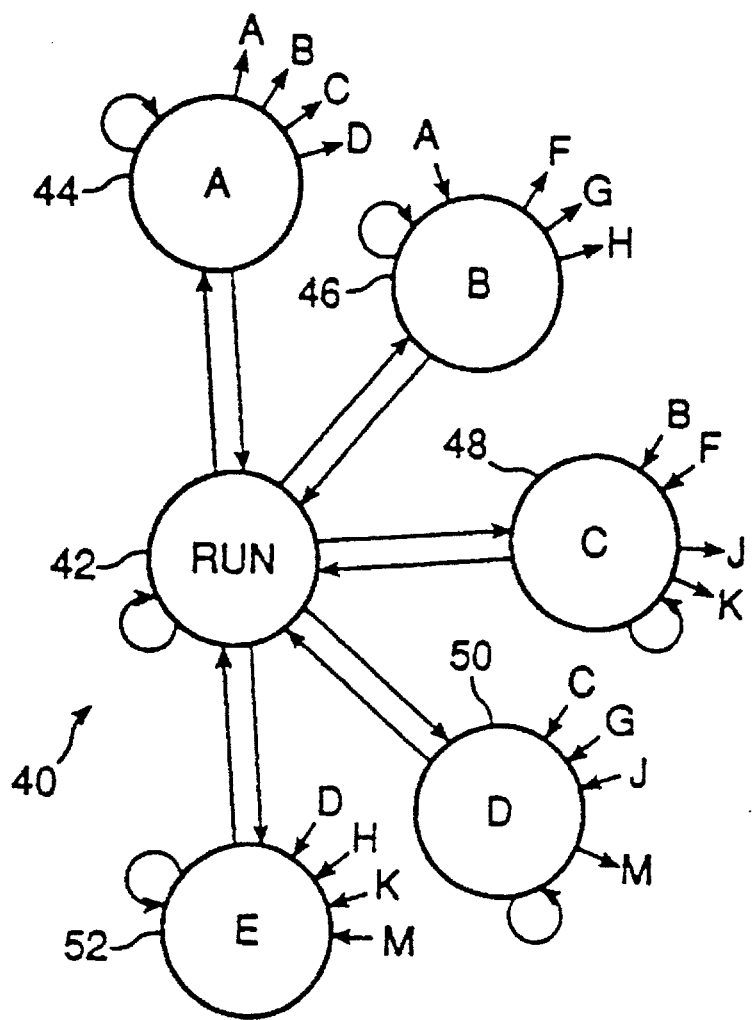
FIG. 8 is a block diagram of a processor state machine for the host processor of FIG. 4.
Figure 9:
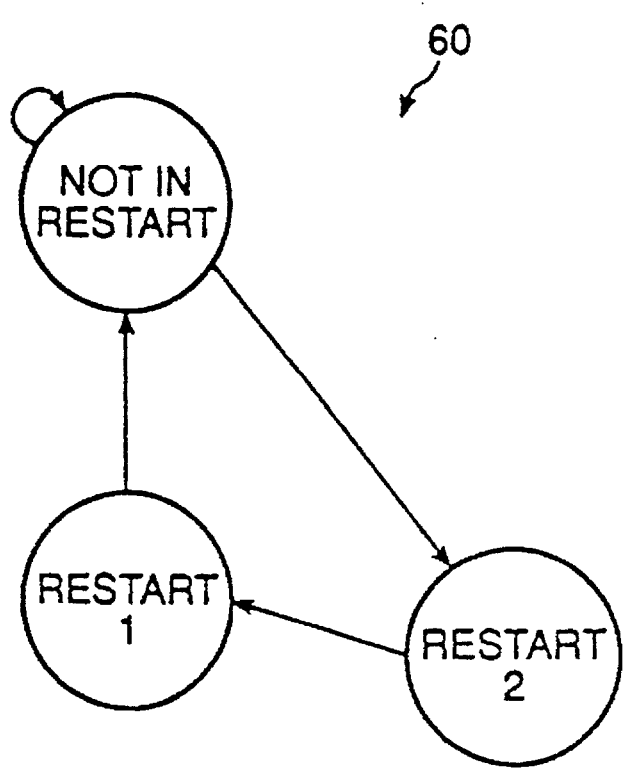
FIG. 9 is a block diagram of a restart state machine for restarting the pipeline according to the method of this invention.

The host processor utilizes several state machines and several control registers to define the state of the pipeline. Referring to FIG. 8, a processor state machine 40 is shown, including a run node 42 and several stall nodes 44, 46, 48, 50, 52. During normal pipeline processing the processor state 40 machine state is positioned at the run node 42. During an interlock fault recovery procedure, the processor state machine 40 state is positioned at one of the stall nodes 44–52. During an exception, the processor state machine 40 state may be positioned at the run node 42 or one of the stall nodes 44–52. Referring to FIG. 9, a restart machine 60 is shown defining the state of a pipeline restart as "not in restart", "restart 2" or "restart 1". According to this embodiment, the processor state machine 40 state is positioned at one of the stall nodes 44–52 while a restart is in process.

With regard to the control registers, various registers are configured to form control register chains. One chain of registers, one register per pipeline stage, forms a pipeline-stage validity chain. Each register in the validity chain stores information which identifies whether the corresponding pipeline stage contains a valid instruction or an invalid instruction. One or more pipeline stages are invalidated in response to an interlock or exception.

Several other register chains form instruction decoder register chains. An instruction decoder chain is present for various operations, including ALU, memory, and co-processor. For the ALU operations, a two-stage chain is formed, one corresponding to the RF pipeline stage, the other for the EX pipeline stage. The content of each register defines the type of operation required for the instruction in the corresponding pipeline stage (i.e., shift ALU left, shift ALU right). For the memory chain, a six-stage chain is formed, one per pipeline stage from pipeline stage RF to pipeline stage WB. Again, the content defines the operation to be done during the corresponding pipeline stage. For example, a portion of the chain corresponds to a load/store chain, in which the contents defines whether a load operation or store operation is required. For the co-processor chain, a four-stage chain is formed, one per pipeline stage from pipeline stage RF to pipeline stage DS.

Another instruction decoder chain is a bypass chain. The bypass chain identifies to which register file a given instruction will write in its WB stage, so that subsequent instructions will know whether to bypass the result of the instruction if the result has not yet been written to such register file.

The state machines and control registers define the operation of the host processor. During normal pipeline processing, the stall machine is in the run state and the restart machine is in the "not in restart" state. During each clock cycle of normal pipeline processing, a three step sequence is performed to resolve whether the pipeline advances. First, all possible fault causing events are individually evaluated. Second, based upon a predefined priority scheme, the fault to be serviced is identified. Third, pipeline advance control signals are buffered and distributed to recover from the fault and restart the pipeline.

Once a fault is identified, the appropriate fault recovery procedure commences. For the coprocessor busy interlock (CPBI), multiply-divide unit busy (MDB) and variable shift (VSH) slip interlocks, fault recovery procedures are not needed. Part of the pipeline simply is stalled while waiting for a busy device to become available.

For interlocks which require a restart, the stall machine switches from the run node to one of the stall nodes corresponding to the interlock to be serviced. Referring to FIG. 8, five stall nodes A, B, C, D, E are shown. Node A corresponds to a common fault recovery scheme for the following interlocks: data cache miss (DCM); Cache state change (CSC); and Watch. Node B corresponds to a common fault recovery scheme for the following interlocks: Sign extend (SXT); store interlock (STI); floating point exception (CPBE). Node C corresponds to a fault recovery procedure for an instruction cache miss (ICM). Node D corresponds to a fault recovery procedure for an instruction translation miss (ITM). Node E corresponds to a procedure for a multiprocessing stall. The fault recovery operations occurring during the respective stall states of the stall machine are described above with the description of pipeline faults.

Processing during a stall is controlled by additional state machines not shown. For each stall node A, B, C, D, E an individual state machine is defined which determines the operations to be performed to recover from the fault condition. Upon completion of recovery processing for a given interlock, another interlock may be handled as shown by the arrows leading out of a respective stall node to another stall node.

Interlocks serviced through node A are of the highest priority. Thus for multiple interlocks, after completion of servicing an A-node interlock, the processor state machine recycles the A-node or switches to one of the other nodes. Upon completion of a B-node fault, the processor state machine similarly recycles the B node recovery procedures for another B-node interlock as shown by the B-node arrow returning to the B node or switches to one of nodes C, D or E as appropriate. Notice that all A-node interlocks would already have been serviced so an arrow from node B to node A is not shown. The processor state machine prioritizes the interlocks from the highest priority at the A node to the lowest priority at the E node, with interlock servicing flowing from higher priority to lower priority interlocks.

When a stall occurs, all eight instructions, each in a different stage of the pipeline, are frozen. Often, the stall condition is only detected after parts of the pipeline have advanced using incorrect data. This situation is referred to as a pipeline overrun. When in the stalled state, parts of the pipeline that are not affected by the overrun are frozen. The other parts are permitted to continue clocking to obtain corrected information, typically by backing up the pipeline to re-do certain stages. Such stages are thus invalid at the time of the interlock. These stages are to be preloaded during the restart sequence with the corrected information.

When a slip condition is detected, the pipeline stages which must advance in order to resolve the dependency continue, while the dependent stages are frozen until the necessary data is available.

At the end of interlock fault-recovery operations, the corresponding stall-node state machine triggers the restart state machine to switch states from "not in restart" to "restart 2". As the restart state switches, the pipeline control registers are backed up by two stages. During the subsequent clock cycles, the pipeline is preloaded as "restart 2" and "restart 1" states are performed. On the next clock cycle, the restart machine switches to the "not in restart" state and the stall state machine switches to the run state. During the restart process, different portions of the pipeline, as needed, are preloaded.

The various interlocks which require a restart may be classified as memory-access type interlocks, execution type interlocks or instruction type interlocks. The memory-access type interlocks include data cache miss (DCM), Cache state change (CSC), and Watch. The execution type interlocks include co-processor busy exception (CPBE), store interlock (STI) and sign extend (SXT). The instruction-type interlocks include instruction translation miss (ITM) and instruction cache miss (ICM).

Figure 10:
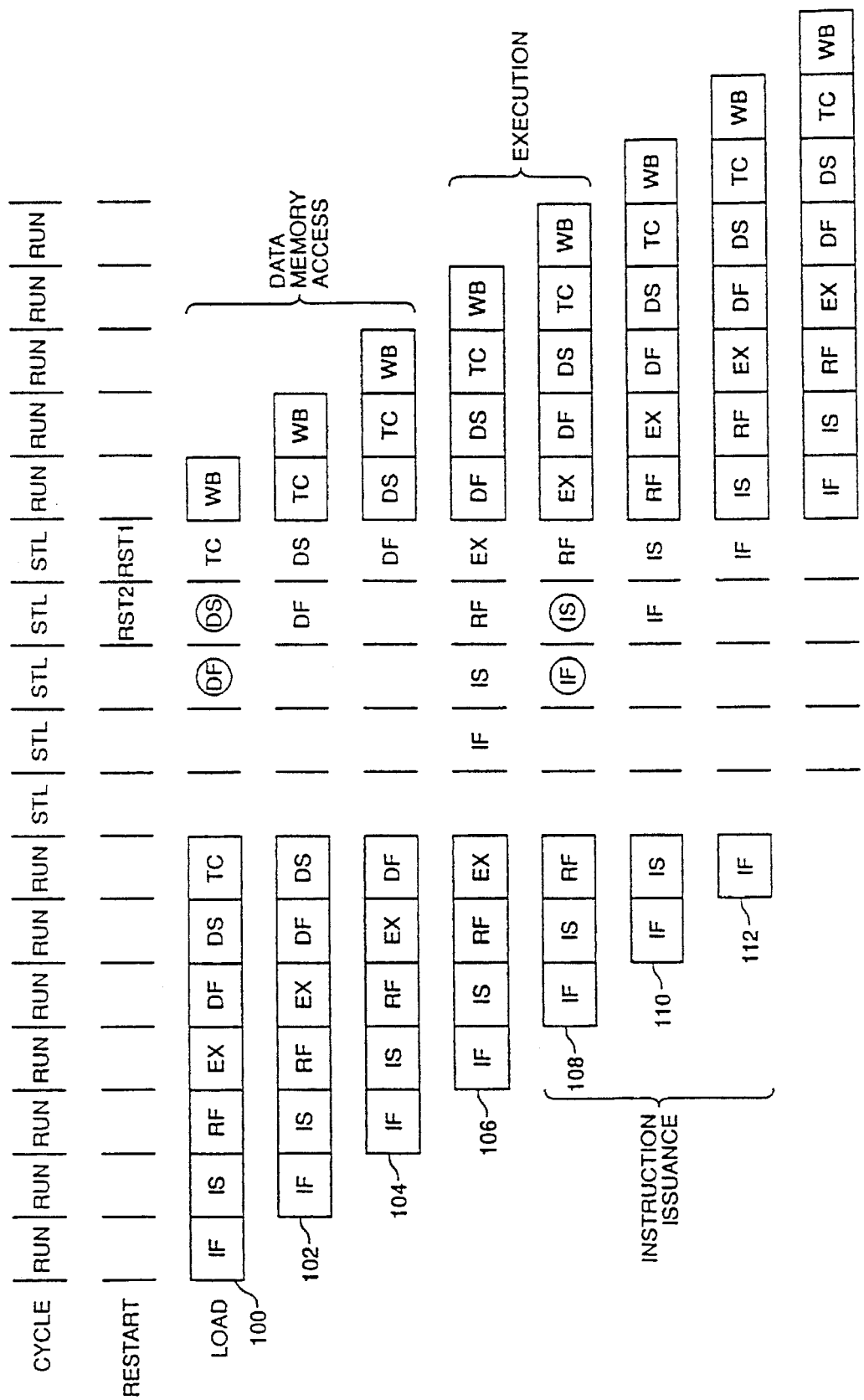
FIG. 10 is a chart depicting the pipeline for a pipeline restart according to an embodiment of the restart method of this invention.

The actions taken during a restart are determined by the type of interlock (e.g., instruction, execution or memory). For instruction-type interlocks, only the fetched instruction, and subsequent instructions are identified to have translation misses (ITM). Accordingly, the instruction portion of the pipeline needs to be pre-loaded. Thus, the IF and IS stages are invalidated and backed up to re-execute the instruction which triggered the interlock, along with ensuing instructions in the pipeline. As shown in FIG. 10, instructions 110 and 112 are backed up. Instruction 110 has both the IF and IS stages re-executed. Instruction 112 has just the IS stage re-executed. For interlocks occurring during the RF stage, however, the instruction portion has to be preloaded through the register file (RF) stage. Thus, the RF stage also is invalidated and backed up to re-execute. As a result, a preload occurs during the cycle before the restart in this special case.

For execution-type interlocks, only the register file and execute stages (e.g., RF and EX) are invalidated. Thus, the RF and EX stages are preloaded. Thus, instruction 106 is backed up to re-execute the RF and EX stages, while instruction 108 is backed up to re-execute in the RF stage.

For memory-type interlocks, only the execute and data access stages (e.g., EX, DF, DS and TC) are invalidated. Thus, the EX, DF, DS and TC stages are preloaded. Thus, instruction 100 has the DF, DS and TC stages backed up and re-executed. Instruction 102 has stages DF and DS backed up and re-executed. Instruction 104 has stage DF backed up and re-executed. Instruction 106 has stages RF and EX backed up and re-executed. Lastly, instruction 108 has stage RF backed up and re-executed.

FIG. 10 shows a pipeline for summarizing the various restart operations. As discussed above the three basic actions are re-performed during restart: data memory access, execution, and instruction issuance. According to one embodiment all the basic operations are performed during a restart. According to an alternative embodiment any or all of the three basic operations may be performed during a restart. For data memory access re-performance, the data fetch first portion is performed during the "restart3" state and corresponding clock cycle. On the subsequent clock cycle ("restart 2" state), the second portion of the instruction's data fetch (DS) is performed, while the first portion (DF) of the next instruction is performed. Then on the next clock cycle ("restart 1"), the tag check (TC) for the first instruction is performed, the second portion of the data fetch (DS) is performed for the second instruction, and the first portion of the data fetch (DF) for the next (e.g., third) instruction is performed. After such "restart 1" clock cycle, the data memory access portion is fully loaded and normal pipeline processing commences, as shown by the entry into the run state.

With regard to the re-performance of an execution action, the preloading commences with the "restart 2" state. During the "restart 2" clock cycle, the register file (RF) stage is performed for an instruction determined to be invalid. On the subsequent "restart 1" clock cycle, the instruction is executed in the EX stage, while the subsequent instruction has the RF stage operations performed. After such "restart 1" clock cycle, the execution portion is fully loaded and normal pipeline processing commences, as shown by the entry into the run state.

With regard to the re-performance of the instruction issuance actions, the preloading commences during the last cycle of the stall or at or "restart 2" state as determined by the interlock. As discussed above, for RF stage interlocks, the instruction preloading is carried out to the RF stage. As a result preloading starts in the last cycle of the stall. According to another embodiment, such last cycle may alternatively be a restart 3 cycle. For the IS stage interlock, the instruction preloading is performed in two clock cycles.

For the three clock cycle instruction preload, the restart commences with the last cycle of the stall state. During the stall cycle, the lead instruction undergoes the first portion of the instruction fetch (IF stage). On the subsequent clock cycle ("restart 2" state), the lead instruction undergoes the second portion of the instruction fetch (IS stage), while the following instruction undergoes the first portion of the instruction fetch (IF stage). On the next clock cycle ("restart 1" state), the lead portion reaches the RF stage, while the subsequent instruction undergoes the second portion of the instruction fetch (IS stage) and the next instruction undergoes the first portion of the instruction fetch (IF stage). After such "restart 1" clock cycle, the instruction issuance portion is fully loaded and normal pipeline processing commences, as shown by the entry into the run state.

For the two clock cycle instruction re-issuance, the actions commence at the "restart 2" state so that the lead instruction only undergoes the IF and IS stages during restart and a subsequent instruction only reaches the IF stage. When the stall machine state switches back to run, the lead instruction reaches the RF stages.

Thus, the pipeline is restarted as described above by preloading portions of the pipeline so that a full pipeline commences upon entry into the run state.

During the run state or a stall state, an exception also may be processed. Exception processing is transparent to the stall machine. During an exception, an exception handler routine is executed. To handle an exception, system control co-processor registers are loaded with information that will identify the type of exception and any necessary auxiliary information, such as the virtual address at which translation exceptions occur.

When an exception condition occurs, the relevant instruction and all that follow it in the pipeline are cancelled. As there is no point in servicing stalls for a cancelled instruction, any stall conditions and any later exception conditions that are referenced to the same instruction are inhibited. A new instruction stream is begun, starting execution at a pre-defined exception vector. Accordingly, in response to an exception the pipeline is cancelled from the relevant instruction onward, exception processing is performed, and the pipeline is started (not restarted). The pipeline is started by returning to normal processing at the run state of the stall machine. As a result, the instructions from the cancelled instructions onward start entering the pipeline on consecutive clock cycles. Thus, if all instructions in the pipeline were cancelled during an exception, the pipeline is not filled again until eight clock cycles after starting the pipeline.

Although a preferred embodiment of the invention has been illustrated and described, various alternatives, modifications and equivalents may be used. Therefore, the foregoing description should not be taken as limiting the scope of the invention which is defined by the appended claims.

What is claimed is:

1. A method of processing instructions by a processor, said method comprising the steps:

operating said processor by cycling a plurality of instructions through a single pipeline, said single pipeline having a plurality of sequential stages including stages for instruction processing and execution;

stalling all of said stages of the pipeline in response to a detected processing fault without stalling as a result solely of a predicted fault;

servicing the detected fault while the pipeline is stalled;

preloading all of said stages of the pipeline invalidated by said processing fault, while maintaining those stages which are not invalid, so as to fill the pipeline while the pipeline is stalled; and running the pipeline upon completion of preloading, wherein the pipeline includes a stage for executing an instruction, in which for an execution type processing fault the execution stage is invalidated and in which said preloading comprises preloading the execution stage.

2. The method of claim 1, in which the pipeline further includes a stage for fetching data operands, in which for a memory-access type processing fault the data fetch stage and execution stage are invalidated, and in which said preloading comprises preloading the data fetching stage and the execution stage.

3. The method of claim 1, in which the pipeline includes a stage for fetching an instruction, in which for an instruction-issuance type processing fault the instruction-fetch stage is invalidated, and in which said preloading comprises preloading the instruction fetching stage.

4. The method of claim 1, in which said step of preloading comprises backing-up invalidated stages of the pipeline and re-executing said stages with corrected information.

5. A method of processing instructions by a processor according to a multi-stage pipeline in which stall states for avoiding potential processing interdependencies are not built into the normal running of the pipeline, potential processing interdependencies are presumed to be absent, the occurrence of such an interdependency being detected as a processor fault, the method comprising the steps:

operating said processor by cycling a plurality of instructions through said multi-stage pipeline, said pipeline having a plurality of sequential stages including stages for instruction processing and execution;

stalling the pipeline in response to a detected processing fault without stalling as a result solely of a predicted fault, wherein at least one other fault exists when said step of stalling occurs;

servicing the detected fault and other faults in a prioritized manner while the pipeline is stalled;

preloading all of said stages of the pipeline invalidated by said processing fault, while maintaining those stages which are not invalid, so as to fill the pipeline while the pipeline is stalled; and running the pipeline upon completion of preloading, wherein the pipeline includes a stage for executing an instruction, in which for an execution type processing fault the execution stage is invalidated and preloaded.

6. The method of claim 5, in which said step of preloading comprises backing-up invalidated stages of the pipeline and re-executing said stages with corrected information.

7. An apparatus for restarting a multi-stage instruction pipeline comprising:

means for stalling the pipeline in response to a detected processing fault without stalling as a result solely of a predicted fault;

means for servicing said detected fault while the pipeline is stalled; and means for preloading all of said stages of the pipeline which are invalidated by said processing fault, while maintaining those stages which are not invalid, so as to fill the pipeline while the pipeline is stalled before resuming normal pipeline processing wherein said multi-stage instruction pipeline has a plurality of sequential stages including stages for instruction processing and a stage for execution in which for an execution type processing fault the execution stage is invalidated and in which said preloading comprises preloading the execution stage.

8. A method of processing instructions by a processor, said method comprising the steps:

operating said processor by cycling a plurality of instructions through a single pipeline, said single pipeline having a plurality of sequential stages including stages for instruction processing and execution;

stalling all of said stages of the pipeline in response to a detected processing fault without stalling as a result solely of a predicted fault;

servicing the detected fault while the pipeline is stalled;

preloading all of said stages of the pipeline invalidated by said processing fault, while maintaining those stages which are not invalid, so as to fill the pipeline while the pipeline is stalled, said step of preloading comprising backing up invalidated stages of the pipeline and re-executing said stages with corrected information; and running the pipeline upon completion of preloading, wherein the pipeline includes a stage for executing an instruction, in which for an execution type processing fault the execution stage is invalidated and in which said preloading comprises preloading the execution stage.

* * * * *

UNITED STATES PATENT AND TRADEMARK OFFICE
CERTIFICATE OF CORRECTION

PATENT NO. : 5,590,294
DATED : December 31, 1996
INVENTOR(S) : Mirapuri et al.

It is certified that error appears in the above-indentified patent and that said Letters Patent is hereby corrected as shown below:

On title page, item [54] and col. 1, line 2,

Delete "RETARTING"
    Insert -- RESTARTING --

Signed and Sealed this

Twelfth Day of August, 1997

Attest:

BRUCE LEHMAN

Attesting Officer     Commissioner of Patents and Trademarks